US006594548B2

(12) United States Patent
Bagnordi

(10) Patent No.: US 6,594,548 B2
(45) Date of Patent: Jul. 15, 2003

(54) PORTABLE DIGITAL ASSISTANT

(76) Inventor: Hani Bagnordi, 13 Brinton Avenue, Nepean, Ontario (CA), K2H 6W6

( * ) Notice: Subject to any disclaimer, the term of this patent is extended or adjusted under 35 U.S.C. 154(b) by 0 days.

(21) Appl. No.: 09/832,821

(22) Filed: Apr. 12, 2001

(65) Prior Publication Data

US 2002/0152005 A1 Oct. 17, 2002

(51) Int. Cl.[7] .......... G06F 17/00
(52) U.S. Cl. .......... 700/233; 700/234; 221/2
(58) Field of Search .......... 700/231, 232, 700/233, 234, 235; 221/2

(56) References Cited

U.S. PATENT DOCUMENTS 4,359,631 A 11/1982 Lockwood et al.
RE32,115 E 4/1986 Lockwood et al.
5,239,665 A * 8/1993 Tsuchiya .......... 345/776
5,267,171 A * 11/1993 Suzuki et al. .......... 700/234
5,339,239 A * 8/1994 Manabe et al. .......... 235/375
5,500,517 A 3/1996 Cagliostro
5,520,275 A 5/1996 Foglino
5,630,103 A * 5/1997 Smith et al. .......... 703/6
5,748,485 A 5/1998 Christiansen et al.
5,768,142 A 6/1998 Jacobs
5,769,269 A * 6/1998 Peters .......... 221/7
5,835,732 A * 11/1998 Kikinis et al. .......... 345/173
5,845,262 A * 12/1998 Nozue et al. .......... 705/26
5,860,362 A * 1/1999 Smith .......... 101/494
5,884,140 A * 3/1999 Ishizaki et al. .......... 455/12.1
6,000,522 A 12/1999 Johnson
6,021,390 A * 2/2000 Satoh et al. .......... 700/231
6,072,476 A * 6/2000 Harada et al. .......... 345/1.1
6,263,258 B1 * 7/2001 Dabrowski .......... 221/2
6,295,482 B1 * 9/2001 Tognazzini .......... 700/231
6,322,262 B1 * 11/2001 Trosterud
6,330,490 B1 * 12/2001 Kim et al.
6,381,513 B1 * 4/2002 Takase et al.

FOREIGN PATENT DOCUMENTS

| | | |
|---|---|---|
| CA | 1189973 | 7/1985 |
| CA | 2127600 | 8/1996 |
| CA | 2079406 | 2/1999 |
| JP | 05-089360 | 4/1993 |
| JP | 05-210786 | 8/1993 |
| JP | 06-187359 | 7/1994 |
| JP | 09-023243 | 1/1997 |
| JP | 09-026992 | 1/1997 |
| JP | 09-190578 | 7/1997 |
| JP | 09-305839 | 11/1997 |
| JP | 11-096449 | 4/1999 |
| JP | 2000-029999 | 1/2000 |
| JP | 2000-105850 | 4/2000 |

* cited by examiner

*Primary Examiner*—Khoi H. Tran

(57) ABSTRACT

A vending machine for vending computer software and electronic data into a user's portable device and for providing in one embodiment, travel information, maps etc. either as data or as a printout. The machine has a display to show items available and a keyboard for entering the user's requests. A central unit directs operation of various parts of the apparatus. Connectors for different devices, such as ebook, PDA, and smart cards are provided.

15 Claims, 1 Drawing Sheet

PORTABLE DIGITAL ASSISTANT

FIELD OF THE INVENTION

This invention relates to vending machine apparatus for software and electronic data.

BACKGROUND OF THE INVENTION

Portable devices such as a portable digital assistant (PDA) have a limited memory capacity and it is difficult or even impossible to store in the PDA all the software and data that a user might need in a particular situation. It has been suggested that the data in the PDA could be updated by means of a wireless connection but such a wireless connection is sometimes unreliable particularly when large data files have to be downloaded or transferred from the server to the PDA.

SUMMARY OF THE INVENTION

According to the present invention there is provided vending machine apparatus for vending computer software and electronic data into a portable device of a user and operable by a user comprising storage means in said vending machine for storing data and a variety of software; dispensing means for dispensing said data or software to the portable device of the user; a plurality of connectors each adapted to receive a different type of portable device; display means; means for selectively promoting, by means of said display means, the sale of services to said user; means for collecting payment for said services from said user; a central control means responsive to a request from said user for directing the operation of said various means; a diagnostic interface means to diagnose said portable device by running a diagnostic program on the portable device to determine the type of device and resources available; and means to display a menu on said display means to permit said user to navigate through a list of choices available for purchase and download for the connected portable device.

It will be understood that the vending machine apparatus can vend travel related data such as electronic maps, local restaurant and attraction information, as well as schedules.

THE DRAWINGS

An embodiment of the invention will now be described, by way of example, with reference to the accompanying drawings in which.

DETAILED DESCRIPTION

Figure 1:
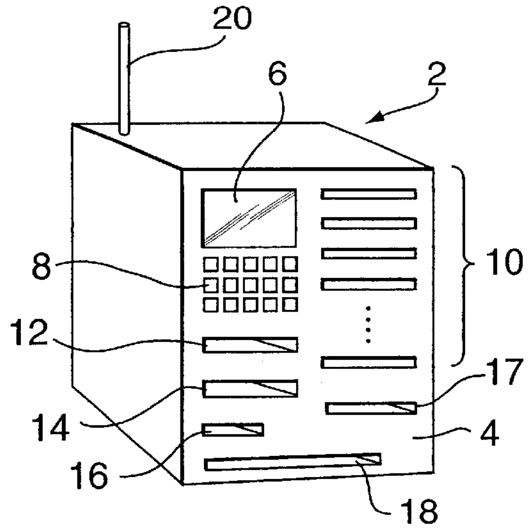
FIG. 1 is a perspective view of a self-service vending machine.

Referring to FIG. 1 the vending machine 2 is of approximately rectanguloid shape and on its front face 4 a liquid crystal display (LCD) unit 6 is provided together with a keyboard 8. A connector interface 10 is also provided and includes a plurality of connectors 10 each adapted to receive a different type of connector from a corresponding different type of portable digital assistant type of device. It will be appreciated that more than one of any particular connector may be provided if the usage in any particular location requires this.

In order to receive payment the vending machine 2 is provided with a cash receiving slot 12, an electronic debit slot 14, a receipt output slot 16 and a slot 17 for dispensing pre-printed material such as tickets, map coupons, etc. Within the vending machine 2 a printer 30 (FIG. 2) is provided and on the front face 4 of the vending machine 2, a printer outlet slot 18 is shown.

A wireless antenna 20 protrudes from the top of the vending machine 2 to facilitate communication via a wireless internet connection. It will be understood that communication may be achieved by other means, for example a wired connection to either a dedicated network or the internet.

Figure 2:
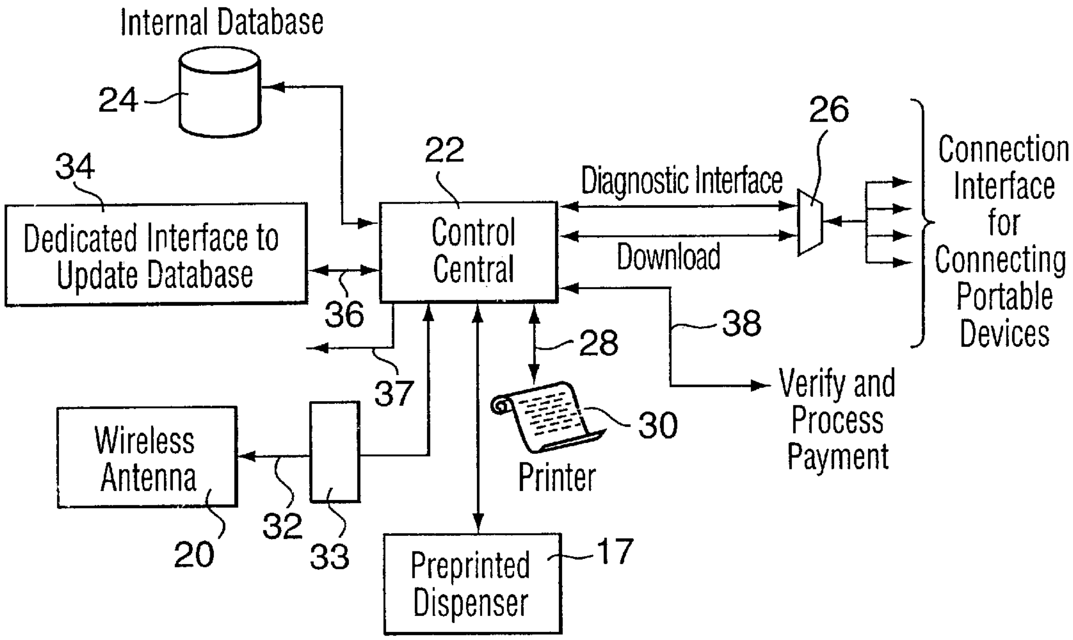
FIG. 2 is a general block diagram of the self-service vending machine.

Within the vending machine 2 the system operates under the control of a central control unit 22 as shown in FIG. 2. An internal data base unit 24 is provided for the central control unit 22.

The various interface connectors of the interface connector 10 are connected to the central control unit 22 through a diagnostic interface unit 26.

A connection 28 to a printer 30 associated with the outlet slot 18 (FIG. 1).

A connection from the central control unit 22 to the wireless antenna 20 is shown at 32 with a wireless internet connection 33 integrated into vending machine 2, and a connection from the central control unit 22 to a dedicated interface 34 for the purpose of updating the database 24 is shown at 36. The apparatus is also able to verify and process payments by way of a connection 38 to the central control unit 22.

In use, a variety of software and data is, for example, stored locally on the vending machine 2 or at a remote location connected via one of the above-mentioned communication means. It is then dispensed on user request through the interactive link, i.e. connector interface 10, between the vending machine 2 and the user. The interface 10 has dedicated connectors that allow users to plug in their receiving device (not shown) and select the data required. The interface link may be external to the vending machine 2 and the receiving device may be an ebook, PDA, add-on to PDA, memory module, smart card with embedded memory, or any portable or wireless device with embedded memory.

After the user pays for the transaction the vending machine 2 downloads the purchased data onto the receiving device and updates all necessary information on the device.

The vending machine 2 thus stores data (software updates and electronic data) on to the fixed storage medium 24 which can be, for example, a hard disk or optical disk, into the portable device containing embedded memory, ebook, PDA, add-onto a PDA, memory module, smart card with embedded memory, or any portable device that contains embedded memory. The PDA, ebook or card etc. connects to a connector 10 of the vending machine 2. Once connected, the vending machine 2 runs a diagnostic program on the connected portable device to determine the type of device and resources available and upon the outcome of this diagnostic operation the apparatus presents the user with a menu on the LCD display unit 6 for the user to navigate through a list of choices available for purchase and download for that particular connected portable device. After the user has made a choice of product to purchase, the total charge is displayed and the user will be requested to make a payment in cash, credit card, debit card, or any other form of electronic payment supported by the vending machine 2. After the payment is made the vending machine 2 downloads the data into the connected device and will do all the necessary updating and error-checking on the user's device to guarantee that the device will properly recognize the newly downloaded data. If an error is generated, the vending machine 2 informs the user by way of the LCD display unit 6 and an action will be determined either to re-download the data or cancel the download and refund the user's money. For an additional cost, the user may obtain a further service from the vending machine 2 whereby the internally embedded printer 30 provides a hard copy of the data purchased, for example, a printout of a map.

The vending machine 2 may also be used to serve as a main centre to provide a user with access to a locally saved database or to connect to the internet through a sophisticated wireless connection to download data or to place an order, for example, a hotel/restaurant reservation and/or book a theatre ticket. It may also be connected via a dedicated network or a wired connection 37.

Data can be downloaded into the local storage space 24 in the vending machine 2 through a dedicated supervisor interface that enables a person with the right access code to download new data into, or upgrade the current database in, the vending machine 2. A typical use for this type of vending machine 2 is as a travel guide module center or an electronic book dispensing machine. Users with a portable device such as a PDA or an electronic travel guide module that connects to a PDA or any portable device that contains embedded memory can purchase and download new travel data such as city maps and/or local travel information into the portable device, for printing later, if required, or from the printer 30 they could obtain a hard copy. The user will also be able to generate a hard copy of a map through the embedded printer 30 in the vending machine 2 or tickets, schedules (train, bus, or airplane), information, coupons etc. Using the combination of the embedded printer 30 and the wireless internet connection 33 integrated into the vending machine 2 a user is able to interactively place a hotel/restaurant reservation, purchase and print tickets to a local show, or purchase and print an airline ticket. The machine may also be equipped to dispense pre-printed tickets, coupons, maps, etc.

Instead of providing storage space in the vending machine apparatus, the storage means for storing data and a variety of software may be external to the apparatus.

Data may be downloaded from the user's device into the vending machine apparatus to produce a hard copy such as a printout, pre-printed map or ticket.

It will be readily apparent to a person skilled in the art that a number of variations and modifications can be made without departing from the true spirit of the invention which will now be pointed out in the appended claims.

I claim:

1. Vending machine apparatus for vending computer software and electronic data into a portable device of a user and operable by a user comprising:

(a) dispensing means for dispensing said data or software to the portable device of the user;

(b) a plurality of connectors each adapted to receive a different type of portable device;

(c) display means;

(d) means for selectively promoting, by means of said display means, the sale of services to said user;

(e) means for collecting payment for said services from said user;

(f) a central control means responsive to a request from said user for directing the operation of said various means;

(g) a diagnostic interface means to diagnose said portable device by running a diagnostic program on the portable device to determine the type of device and resources available;

(h) means to display a menu on said display means to permit said user to navigate through a list of choices available for purchase and download for the connected portable device;

(i) printer means to provide, as desired, a hard copy of information required by the user, said information being stored on said portable device or stored in the vending machine apparatus for purchase by the user; and (j) the vending machine apparatus being adapted to download data from said portable device into the vending machine apparatus and produce a hard copy;

(k) wherein the vending machine apparatus is also adapted to dispense pre-printed material.

2. Vending machine apparatus according to claim 1 including storage means in said vending machine apparatus for storing data and a variety of software.

3. Vending machine apparatus according to claim 1 adapted to utilize codename storage means for storing data and a variety of software.

4. Vending machine apparatus according to claim 1 which further comprises a keyboard operable by said user for entering requests into said central control unit.

5. Vending machine apparatus according to claim 1 wherein the hard copy is a printout.

6. Vending machine apparatus according to claim 1 wherein the hard copy is a pre-printed map.

7. Vending machine apparatus according to claim 1 wherein the hard copy is a ticket.

8. Vending machine apparatus for vending computer software and electronic data into a portable device of a user and operable by a user which comprises:

(a) storage means for storing data and a variety of software;

(b) dispensing means for dispensing said data and software to the portable device of the user;

(c) a plurality of connectors each adapted to receive a different type of portable device;

(d) a display means for displaying a menu to a user to permit the user to navigate through a list of choices available for purchase and download for the connected portable device;

(e) a keyboard operable by said user for entering requested choices;

(f) a central control means responsive to a request from said user for directing the operation of said various means;

a cabinet housing said various means and having on its front face:

(i) a viewing portion of said display means;

(ii) said plurality of connectors;

(iii) said keyboard;

(iv) a cash slot;

(v) an electronic debit slot;

(vi) a receipt outlet slot;

(vii) a printer output slot;

(viii) a slot for dispensing pre-printed material;

and a wireless antenna on top of said cabinet housing.

9. Vending machine apparatus according to claim 8 wherein the machine includes dedicated interfaces to receive a portable electronic device.

10. Vending machine apparatus according to claim 9 wherein the portable electronic device comprises an e-book.

11. Vending machine apparatus according to claim 9 wherein the portable electronic device comprises a PDA.

12. Vending machine apparatus according to claim 9 wherein the portable electronic device comprises a wireless phone.

13. Vending machine apparatus according to claim 9 wherein the portable electronic device comprises a smart card.

14. Vending machine apparatus for vending computer software and electronic data into a portable device of a user and operable by a user which comprises:

(a) store for storing data and a variety of software;

(b) a dispenser for dispensing said data and software to the portable device of the user;

(c) a plurality of connectors each adapted to receive a different type of portable device;

(d) a display for displaying a menu to a user to permit the user to navigate through a list of choices available for purchase and download for the connected portable device;

(e) a keyboard operable by said user for entering a requested choices;

(f) a central controller responsive to a request from said user for directing the operation of said store, dispenser, display, and central controller;

a cabinet housing said store, dispenser, display, and central controller and having on its front face:

(i) a viewing portion of said display;

(ii) said plurality of connectors;

(iii) said keyboard;

(iv) a cash slot;

(v) an electronic debit slot;

(vi) a receipt outlet slot;

(vii) a printer output slot;

(viii) a slot for dispensing pre-printed material;

and a wireless antenna on top of said cabinet housing.

15. Vending machine apparatus for vending computer software and electronic data into a portable device of a user and operable by a user comprising:

(a) a dispenser for dispensing said data or software to the portable device of the user;

(b) a plurality of connectors each adapted to receive a different type of portable device;

(c) a display for selectively promoting the sale of services to said user and for displaying a menu for permitting said user to navigate through a list of choices available for purchase and download for the connected portable device;

(d) a payment collector for said services from said user;

(e) a central controller adapted to be responsive to a request from said user for directing the operation of said various means;

(f) a diagnostic interface for diagnosing said portable device adapted to run a diagnostic program on the portable device to determine the type of device and resources available;

(g) a printer for providing, as desired, a hard copy of information required by the user, said information being stored on said portable device or stored in the vending machine apparatus for purchase by the user; and (h) the vending machine apparatus being adapted to download data from said portable device into the vending machine apparatus and produce a hard copy;

(i) a slot for dispensing pre-printed material.

* * * * *